United States Patent
Zhou (10) Patent No.: US 8,270,393 B2
(45) Date of Patent: Sep. 18, 2012

(54) METHOD FOR SHAPING SPECTRUM OF OUTPUT SIGNAL, AND A REMOTE ACCESS DEVICE

(75) Inventor: Jun Zhou, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1372 days.

(21) Appl. No.: 11/855,321

(22) Filed: Sep. 14, 2007

(65) Prior Publication Data

US 2008/0057997 A1    Mar. 6, 2008

Related U.S. Application Data

(63) Continuation of application No. PCT/CN2006/001800, filed on Jul. 21, 2006.

(30) Foreign Application Priority Data

Jul. 29, 2005    (CN) .......................... 2005 1 0085711

(51) Int. Cl.
*H04L 12/66* (2006.01)
*H04B 3/46* (2006.01)
*H04B 17/00* (2006.01)
*H04Q 1/20* (2006.01)
*H04K 1/10* (2006.01)
*H04L 27/28* (2006.01)

(52) U.S. Cl. ......... 370/352; 375/222; 375/224; 375/260
(58) Field of Classification Search .................. 370/352, 370/485, 469; 375/222, 259, 260, 130
See application file for complete search history.

(56) References Cited

U.S. PATENT DOCUMENTS

| 6,205,220 B1 | 3/2001 | Jacobsen et al. |
| 6,636,603 B1 | 10/2003 | Milbrandt |
| 2004/0057564 A1* | 3/2004 | Rappaport et al. ......... 379/93.01 |

(Continued)

FOREIGN PATENT DOCUMENTS

CN    120576 A    4/2000

(Continued)

OTHER PUBLICATIONS

Foreign Communication From a Related Counterpart Application, Chinese Application 200510085711.4, Office Action dated Mar. 30, 2011, 7 pages.

(Continued)

*Primary Examiner* — Asad M Nawaz
*Assistant Examiner* — Stephanie Chang (57) ABSTRACT

A remote access device and a method for shaping the spectrum of output signal are disclosed, and the method includes: obtaining a power spectrum density of a signal transmitted by a Central Office (CO) access device at a remote access device; dividing a spectrum of an output signal of the remote access device into a spectrum overlapping portion and a spectrum non-overlapping portion according to the power spectrum density of the signal transmitted by the CO access device; and shaping the power spectrum density of the output signal in the spectrum overlapping portion according to the power spectrum density of the signal transmitted by the CO access device. In accordance with the embodiment of the present invention, it is possible to automatically or manually set the spectrum of downlink signal of CO access device at the remote access device, which maximizes the spectrum utilization ratio of remote access device, and it is possible to get the better transmission performance in accordance with the embodiment of the present invention.

7 Claims, 5 Drawing Sheets

U.S. PATENT DOCUMENTS

2004/0096052 A1    5/2004   Liu

FOREIGN PATENT DOCUMENTS

| CN | 1250276 A | 4/2000 |
|----|-----------|--------|
| EP | 0969605 B1 | 1/2000 |
| EP | 1 370 057 A1 | 12/2003 |
| EP | 1 494 490 A1 | 1/2005 |
| WO | 0051303 A1 | 8/2000 |

OTHER PUBLICATIONS

Foreign Communication From a Related Counterpart Application, Chinese Application 200510085711.4, Partial English Translation Office Action dated Mar. 30, 2011, 8 pages.

Foreign communication from a counterpart application, Chinese Application 200510085711.4, Office Action dated Aug. 12, 2010, 5 pages.

Foreign communication from a counterpart application, Chinese Application 200510085711.4, Partial English Translation Office Action dated Aug. 12, 2010, 8 pages.

Foreign Communication From a Related Counterpart Application - European Search Report, 06761535.1, Aug. 4, 2009, 6 pages.

Foreign communication from a counterpart application, Australian application 2006274346, Office Action dated Jul. 7, 2009, 2 pages.

Foreign communication from a counterpart application, Australian application 2006274346, Office Action dated Jan. 29, 2010, 2 pages.

Foreign communication from a counterpart application, Chinese application 200680012192.1, Office Action dated Sep. 4, 2009, 6 pages.

Foreign communication from a counterpart application, Chinese application 200680012192.1, Partial English Translation, Office Action dated Sep. 4, 2009, 6 pages.

Foreign communication from a counterpart application, Chinese application 200510085711.4, Office Action dated Oct. 10, 2008, 4 pages.

Foreign communication from a counterpart application, Chinese application 200510085711.4, Partial English Translation Office Action dated Oct. 10, 2008, 2 pages.

Foreign communication from a counterpart application, PCT application PCT/CN2006/001800, English Translation Written Opinion dated Nov. 23, 2006, 3 pages.

Communication from a counterpart application, Chinese application 200510085711.4, Office Action dated Dec. 21, 2010, 4 pages.

Communication from a counterpart application, Chinese application 200510085711.4, Partial English Translation Office Action dated Dec. 21, 2010, 3 pages.

* cited by examiner

METHOD FOR SHAPING SPECTRUM OF OUTPUT SIGNAL, AND A REMOTE ACCESS DEVICE

FIELD OF THE INVENTION

The present invention relates to communication field, more particularly, relates to a method for shaping the spectrum of output signal, and a remote access device.

BACKGROUND OF THE INVENTION

The x Digital Subscriber Line (xDSL) technology may be divided into rate symmetric type and rate asymmetric type according to whether the uplink (from a user to the switching office) rate is the same as the downlink (from the switching office to a user) rate. The xDSL of asymmetric type includes Asymmetric DSL (ADSL) and Very high bit rate DSL (VDSL), which is applicable for the Internet service in which the downlink data quantity is large since its downlink rate is very high.

The ADSL technology has developed from the first generation ADSL to the current second generation ADSL2, ADSL2+ and VDSL2, the frequency band of the ADSL is gradually increased and the corresponding bandwidth is gradually increased too. And the ADSL and ADSL2 use the spectrum less than 1.1 MHz as the downlink bandwidth to provide a maximal downlink rate of 8 Mbps; ADSL2+ extends the downlink bandwidth to 2.2 MHz to provide a maximal downlink rate of 24 Mbps; VDSL2 even uses 30 MHz spectrum to provide a maximal uplink/downlink rate of 100 Mbps.

Figure 1:
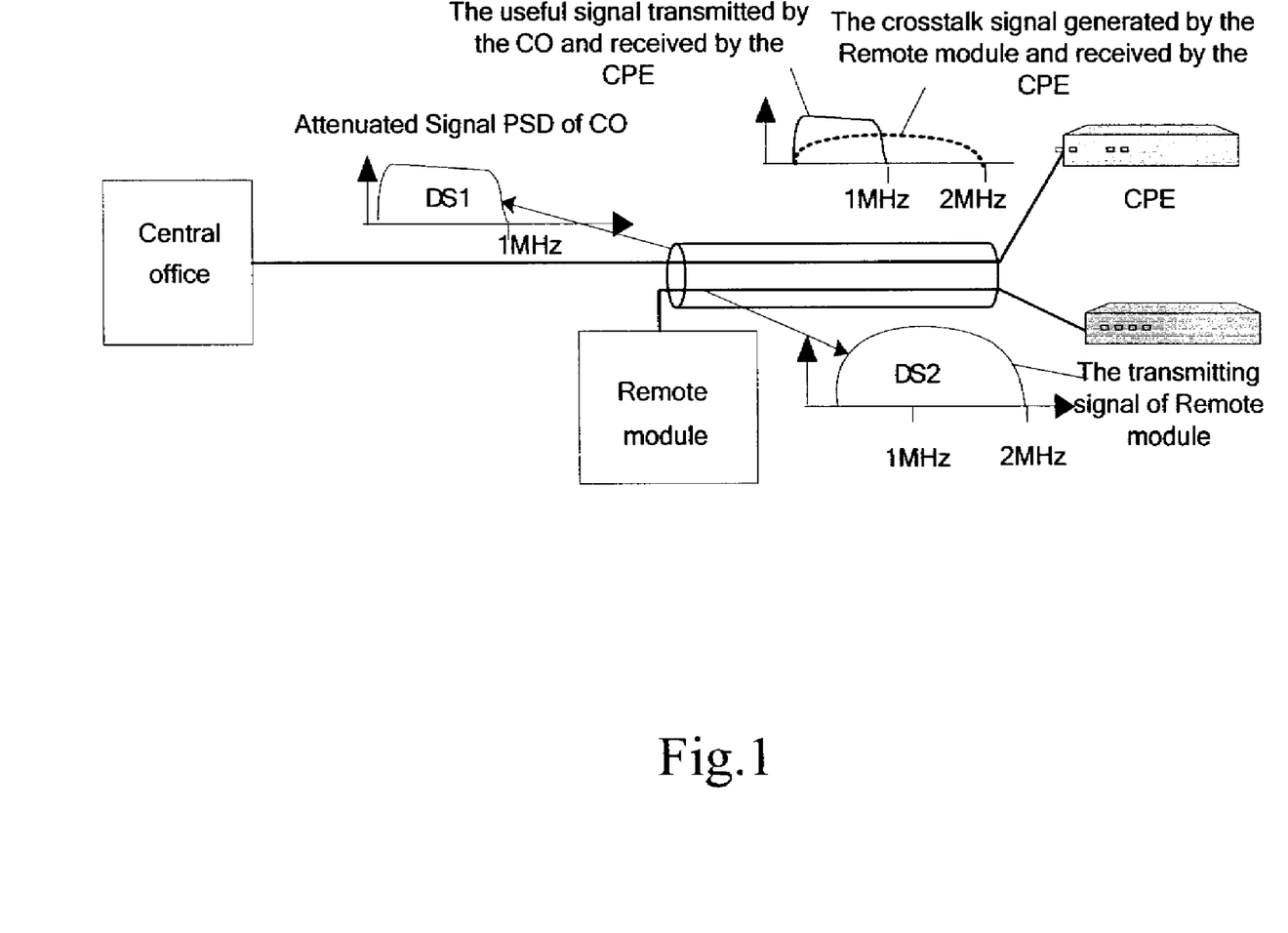
FIG. 1 is a schematic diagram illustrating the principle for generating the crosstalk between the signal of CO access device and the signal of remote xDSL access device.

The prior xDSL access device is generally located at a Central Office (CO); with the increase of bandwidth requirement, the xDSL is required to be closer to the user. Therefore, the application pattern of the xDSL access device located at the Remote Module (RT) is gradually increased, and in particular, VDSL2 is mainly located at the location close to the user such as districts, buildings and roadsides, which leads to some spectrum compatibility problems, for example, a Digital Subscriber 1 (DS1) signal amplitude of the xDSL access device located at the CO is very small due to attenuation. The crosstalk between the downlink DS1 signal of the xDSL access device (ADSL2+ device of the remote Digital Subscriber Line Access Multiplexer (DSLAM) module 100 as shown in FIG. 1) close to the user terminal and the downlink DS2 signal of the xDSL access device located at the CO will influence the Signal to Noise Ratio (SNR) of DS1 signal, and result in the performance reduction. Therefore, it is necessary to use some measures to reduce the influence caused by the crosstalk. Due to the above problem, many operators constitute theirs own spectrum application management criterions to stipulate the spectrum planning in various application cases, which avoids the performance descent caused by the mutual interference between various devices.

Figure 2:
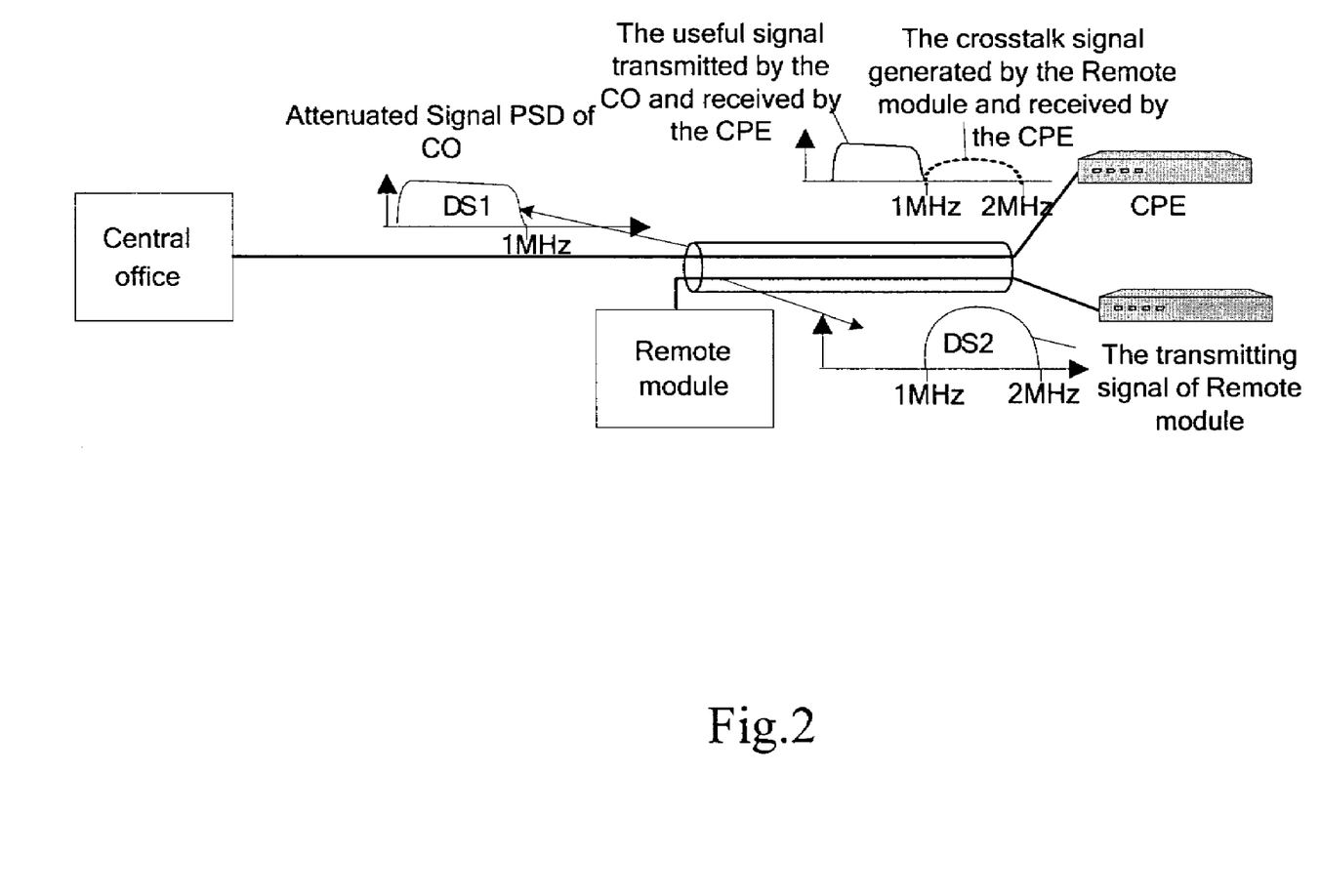
FIG. 2 is a schematic diagram illustrating the principle for avoiding the crosstalk between the signal of CO access device and the signal of remote xDSL access device in the prior art.

One prior art associated with the present invention is the solution described in an European patent, patent number EP1370057, in the European patent the fixed spectrum settings is used to avoid the crosstalk by closing some carriers of relevant frequency band (tone disabling) according to the location and requirement of the remote module. As shown in FIG. 2, the overlapping portion (as the dot line shown in FIG. 2) between the DS signal of the frequency band from 1 MHz to 2 MHz in the remote ADSL2 and the DS signal of the downlink frequency band in the CO ADSL is closed to reduce the downlink interference in the CO ADSL. The crosstalk between the downlink signal of the remote module and the downlink signal of the CO module may be avoided since two spectrums are not overlapped any more.

As can be seen from the solution of the above prior art, the spectrum compatibility requirement may be met in the prior art, but the remote DSLAM only uses the carrier of the frequency band more than 1.1 MHz; the carrier performance rapidly descends along with the increase of line distance since the attenuating degree of the carrier within the frequency band more than 1.1 MHz is greater than that within the frequency band less than 1.1 MHz along with the increase of the line distance, so that the performance index of the remote xDSL access device is severely restricted. Practically, the CO signal may be transmitted by means of the relatively low power spectrum density since the line has certain crosstalk rejection capability (the parameter for quantificationally describing the crosstalk rejection capability of the line is referred to as crosstalk rejection ratio), which does not influence the CO service greatly.

In addition, the fixed spectrum settings is used in the prior art, while the spectrum in the line is dynamically changed practically. Therefore, the system using the fixed spectrum settings is unable to adapt for the spectrum change in the line dynamically, which makes the flexibility worse and the spectrum utilization rate lower.

SUMMARY OF THE INVENTION

The embodiment of the present invention provides a remote access device and a method for shaping the spectrum of output signal, which improves the performance index of access device, the flexibility of spectrum settings and the spectrum utilization rate.

A method for shaping a spectrum of an output signal of a remote access device includes: obtaining a power spectrum density of a signal transmitted by a CO access device at a remote access device; dividing a spectrum of an output signal of the remote access device into a spectrum overlapping portion and a spectrum non-overlapping portion according to the power spectrum density of the signal transmitted by the CO access device; and shaping the power spectrum density of the output signal in the spectrum overlapping portion according to the power spectrum density of the signal transmitted by the CO access device.

A remote access device includes: a storage module which is configured for obtaining a power spectrum density of a signal transmitted by a CO access device at the remote access device; a shaping module which is configured for dividing a spectrum of an output signal into a spectrum overlapping portion and a spectrum non-overlapping portion according to the power spectrum density of the signal transmitted by the CO access device, and shaping the power spectrum density of the output signal in the spectrum overlapping portion based on the power spectrum density of the signal transmitted by the CO access device.

As can be seen from the embodiments of the present invention, the method makes it possible for the remote access device to use the carrier within the frequency band more than 1.1 MHz, and effectively solves the problem for restricting the performance index of remote access device greatly; according to the embodiments of the present invention, it is possible to automatically or manually set the spectrum of downlink signal of CO access device at the remote access device, which maximizes the spectrum utilization ratio of remote access device; therefore, the method and the access device provided by the embodiment of the present invention have better spectrum compatibility capability and flexibility for setting spectrums, which makes it possible to get a better transmission performance in accordance with the embodiments of the present invention.

DETAILED DESCRIPTION OF THE INVENTION

For the transmission properties of the twisted pair line, the attenuation exponentially increases along with the increase of frequency, i.e. the signal attenuates sharply along with the increase of line length, and the crosstalk of signal increases along with the increase of frequency, the crosstalk in high frequency band is more serious than that in low frequency band. The embodiment of the present invention utilizes the line crosstalk rejection ratio function to shape the power spectrum density of signal transmitted by the CO access device in the overlapped frequency band, and the remote xDSL access device transmits signal in the overlapped frequency band with the low power spectrum density, which does not influence the CO service greatly.

The embodiments of the present invention provide an access device and a method for shaping the spectrum of output signal. According to the embodiments of the present invention, the method includes: obtaining a PSDco-rt, namely power spectrum density of signal transmitted by a CO access device at a remote access device; dividing a spectrum of signal transmitted by the remote access device into a spectrum overlapping portion and a spectrum non-overlapping portion according to the PSDco-rt; determining a power spectrum density of signal transmitted by the remote access device in the spectrum overlapping portion based on the PSDco-rt, and obtaining a shaped spectrum of signal transmitted by the remote access device, for example, regarding the PSDco-rt as the power spectrum density of signal transmitted by the remote access device in the spectrum overlapping portion, and getting the shaped spectrum, i.e. the spectrum of signal transmitted practically by the remote access device.

According to the embodiments of the present invention, for the spectrum overlapping portion of signal transmitted by the CO xDSL access device and the spectrum overlapping portion of signal transmitted by the RT xDSL access device, the crosstalk is the same as that made by the CO located at other ports as long as the Power Spectrum Density (PSD) of signal transmitted by the remote access device is the same (or approximately the same) as the PSD (referred to as the signal delivered by the CO at the RT) at the RT delivered by the CO access device via a line between the CO access device and the RT, which generates no severe influence; and it is needless to adjust the frequency band which is used at the RT and not used at the CO.

Figure 3:
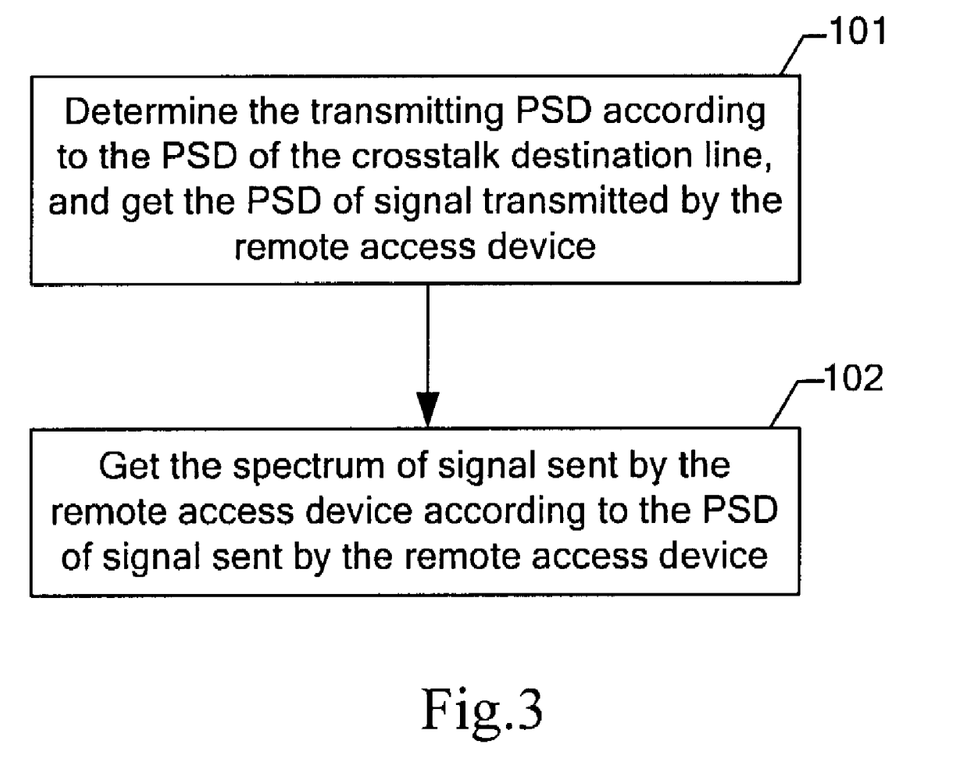
FIG. 3 is a flowchart for shaping the output signal spectrum of access device in accordance with an embodiment of the present invention.

As shown in FIG. 3, one specific embodiment of the present invention includes:

Step 101: determining a transmitting PSD according to a PSD of a crosstalk destination line, and getting the PSD of signal transmitted by the remote access device.

The Step 101 specifically includes:

when the CO access device and the remote access device share the line, determining the PSD of signal transmitted by the RT according to the PSD of the crosstalk destination line (i.e. the CO line), getting the transmitting PSD of spectrum overlapping portion between signal transmitted by the CO and signal used by the remote access device, and determining the transmitting PSD of the spectrum non-overlapping portion of the signal transmitted by the RT.

The process of determining the remote transmitting PSD according to the PSD of the crosstalk destination line, and getting the transmitting PSD of spectrum overlapping portion between signal transmitted by the CO and signal used by the remote access device specifically includes:

at first, calculating the power spectrum density PSDco-rt of signal transmitted by the CO at the remote access device; then, determining the transmitting PSD of the RT transmitting carrier by determining whether the power spectrum density PSDrt of signal transmitted by the remote access device is the same as the power spectrum density PSDco-rt of signal transmitted by the CO at the remote access device.

The process of calculating the power spectrum density PSDco-rt of signal transmitted by the CO at the remote access device includes the following two schemes.

The first scheme specifically includes:

at first, obtaining a distance between the remote access device and the CO access device, and a line transfer function illustrating a relationship between line attenuation and frequency; then, calculating manually or by means of software the PSDco-rt at the remote access device according to the distance and the line transfer function, wherein the PSDco-rt is the PSDco-rt of the attenuated signal transmitted by the CO.

The second scheme specifically includes:

at first, testing the power spectrum density PSDxtalk of the crosstalk signal made by signal transmitted by the CO at the RT; secondly, obtaining the line crosstalk coupling function $H_{NEXT}$ of the communication system; at last, calculating the power spectrum density PSDco-rt of signal transmitted by the CO at the RT according to the tested power spectrum density PSDxtalk of the crosstalk signal and the obtained line crosstalk rejection ratio function.

The process of determining the transmitting PSD of the spectrum non-overlapping portion of the signal transmitted by the RT specifically includes:

determining the transmitting PSD shaping coefficient Tss (i) of the spectrum non-overlapping portion of the signal transmitted by the RT as 1; or, determining the transmitting PSD shaping coefficient Tss (i) of the spectrum non-overlapping portion of the signal transmitted by the RT as other preset values (for example the PSD mask defined in standard, the Limited PSD of area standard or the restriction value got by other schemes).

Step 102: getting the shaped spectrum of signal transmitted by the remote access device according to the determined PSD of the spectrum overlapping portion and the determined PSD of the spectrum non-overlapping portion.

The solution of the present invention is hereinafter described in detail with respect to two embodiments.

The first embodiment provided by the present invention calculates the PSDco-rt of the signal PSDco at the remote module according to the distance between the remote xDSL access device RT and the CO xDSL access device, and the line transfer (attenuation) function illustrating the relationship between line attenuation and frequency, wherein the signal PSDco is transmitted by the CO and is attenuated. The spectrum overlapping portion of the RT transmitting power spectrum density PSDrt and the PSDco is set as the PSDco-rt. the Tss(i) coefficient of the spectrum overlapping portion of signal transmitted by the remote xDSL access device Remote module and signal transmitted by the CO xDSL access device is obtained; the transmitting power spectrum density is calculated to get the shaped spectrum according to the obtained Tss(i) coefficient; and the non-overlapping portion is also computed.

The above procedure specifically includes the following.

The transmitter generally transmits signal by means of nominal TX power of tone(i) according to the template recommended by the standard. To shape the spectrum, the standard imports a Transmitting Spectrum Shaping coefficient, i.e. Tss(i) coefficient. Therefore, the shaped transmitting power spectrum density of signal transmitted by the remote xDSL access device may be calculated by Equation 1:

$$PSDrt(i)=TX \text{ power of tone}(i)=\text{nominal } TX \text{ power of tone}(i) \times Tss(i) \qquad \text{Equation 1}$$

Take the logarithm of two sides of Equation 1 to get the shaped transmitting power spectrum density as shown by Equation 2:

$$PSDrt(i)=10 \log TX \text{ power of tone}(i)=10 \log \text{ nominal } TX \text{ power of tone}(i)+10 lgTss(i) \qquad \text{Equation 2}$$

If the line transfer function (attenuation function) is Attenu(i) (dB/km), the distance between the CO and the RT is L, the power spectrum density of signal transmitted by the CO xDSL access device at the RT may be obtained using the following Equation 3:

$$PSDco\text{-}rt(i)=10 \log TX \text{ power of tone}(i)-L \times Attenu(i) \qquad \text{Equation 3}$$

According to the embodiment of present invention, it is to set PSDrt(i)=PSDco-rt(i), and combine Equation 2 and Equation 3, which makes it possible to get the Tss(i) coefficient of the spectrum overlapping portion of signal transmitted by the remote xDSL access device and signal transmitted by the CO xDSL access device; in this way, the Tss(i) of total frequency bands includes the following.

Tss(i)=the result by combining Equation 2 with Equation 3 . . . the Tss(i) coefficient of the spectrum overlapping portion of signal transmitted by the remote xDSL access device and signal transmitted by the CO xDSL access device;

Tss(i)=1 or preset values for other reasons . . . the Tss(i) coefficient of the spectrum non-overlapping portion of the signal transmitted by the remote xDSL access device.

The remote transceiver configures the transmitting power spectrum density of the remote access device according to the Tss(i) coefficient of different frequency bands obtained by means of the above schemes, which is shown by Equation 1;

$$PSDrt(i)=TX \text{ power of tone}(i)=\text{nominal } TX \text{ power of tone}(i) \times Tss(i) \qquad \text{Equation 1}$$

Figure 4:
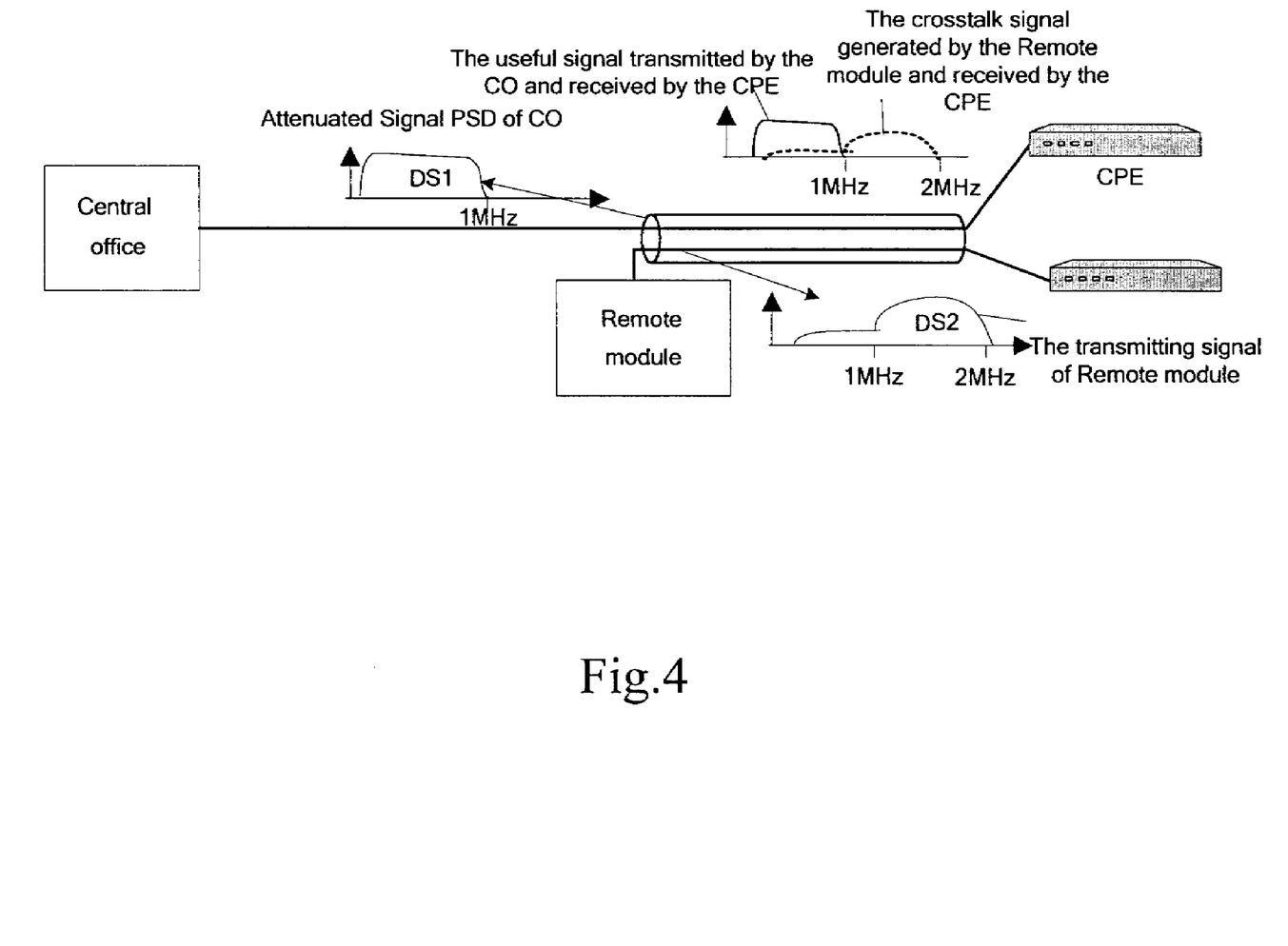
FIG. 4 is a schematic diagram illustrating the principle for shaping the output signal spectrum of access device in accordance with another embodiment of the present invention.

Get the shaped spectrum, as shown in FIG. 4.

Contrasting FIG. 4 with FIG. 2, the remote access device only uses the carrier within the frequency band more than 1.1 MHz in the prior art, while the remote access device uses the carrier within the frequency band less than or more than 1.1 MHz in accordance with the present invention.

The second embodiment provided by the present invention calculates the power spectrum density of signal transmitted by the CO xDSL access device according to the tested power spectrum density of the crosstalk signal made by the signal transmitted by the CO at the RT, by means of the background noise testing function of ADSL2+ and VDSL2 as well as the searched line crosstalk coupling function; sets the overlapping portion of the PSDrt and the PSDco as the PSDco-rt, and gets the Tss(i) coefficient of the spectrum overlapping portion of signal transmitted by the remote xDSL access device, i.e., Remote module, and signal transmitted by the CO xDSL access device, and calculates the transmitting power spectrum density of the remote xDSL access device according to the obtained Tss(i) coefficient to get the shaped spectrum; the non-overlapping portion is calculated according to the same method as that of the first embodiment.

The procedure specifically includes the following, taking the local crosstalk as an example:

If the local line crosstalk rejection ratio (also referred to as the crosstalk isolation, which is defined as the crosstalk signal amplitude when the transmitting power of crosstalk source is 0 dB) function is CTRR(f), which is a function of frequency; in this way, the above power spectrum density of crosstalk signal made by the PSDco-rt for the RT is as shown by Equation 4:

$$PSDxtalk(i)=PSDco\text{-}rt(i)-CTRR(i) \qquad \text{Equation 4}$$

wherein i represents the crosstalk rejection ratio of tone i frequency point when the length is L. The crosstalk rejection ratio function may be obtained from the crosstalk coupling function $H_{NEXT}$, $$CTRR(i)=20||\log|H_{NEXT}(i)||$$

In accordance with the above mentioned, the influence made by PSDxtalk(i) for PSDco(i) is equivalent with that made by other CO ports for PSDco(i) as long as the PSDco-rt(i) of signal transmitted by the CO at the RT is the same as the PSDrt of signal transmitted by the RT. In other words the crosstalk influence made by the remote module to the CO module is equivalent with the crosstalk of the CO; in this way, the crosstalk influence decreases greatly. In other words the power spectrum density of signal transmitted by the RT is the data calculated by the following Equation 5:

$$PSDrt(i)=PSDco\text{-}rt(i)=PSDxtalk(i)+CTRR(i) \qquad \text{Equation 5}$$

PSDxtalk(i) may be obtained by testing the static background noise, and the CTRR may be obtained from the line manual or according to the experiential parameter. Therefore, the Tss(i) coefficient of the spectrum overlapping portion of signal transmitted by the remote xDSL access device Remote module and signal transmitted by the CO xDSL access device may be obtained by combining Equation 2 of the first embodiment and Equation 5 of the second embodiment.

In this way, the Tss(i) of the total frequency bands includes the following.

Tss(i)=the result by combining Equation 2 with Equation 5 . . . the Tss(i) coefficient of the spectrum overlapping portion of signal transmitted by the remote xDSL access device and signal transmitted by the CO xDSL access device;

Tss(i)=1 or preset values for other reasons . . . the Tss(i) coefficient of spectrum non-overlapping portion of the remote xDSL access device.

The remote transceiver configures the transmitting power spectrum density of the remote access device according to the Tss(i) coefficient of different frequency bands obtained by means of the above schemes, which is still as shown by Equation 1.

Get the shaped spectrum which is as shown in FIG. 4.

Contrasting FIG. 4 with FIG. 2, the remote access device only uses the carrier within the frequency band more than 1.1 MHz in the prior art, while the remote access device uses the carrier within the frequency band less than 1.1 MHz or more than 1.1 MHz in accordance with the embodiment of the present invention.

To sum up, in the first and second embodiments in accordance with the present invention, it is possible to automatically or manually set and optimize the spectrum of remote access device, which makes it possible that the influence on the CO made by the RT is the same as that made by other ports of the CO (thereby resulting in no new service quality descent), and maximizes the spectrum utilization ratio of remote access device, thereby getting a better transmission performance.

It is necessary to know the line length and the line transfer function in the first embodiment, wherein the line length may be searched from the line database and the line transfer function may be obtained by the line dual-ended test (line diagnosis mode) of ADSL2, ADSL2+ or VDSL2. Therefore, the spectrum of remote access device may be set and optimized manually in accordance with the embodiments of the present invention.

It is just necessary to know the crosstalk rejection ratio between lines in the second embodiment. The crosstalk rejection ratio may also be obtained from the line manual. And the spectrum of remote access device may be set and optimized automatically.

The access device provided by the embodiment of the present invention is hereinafter described with respect to FIG. 5 and FIG. 6. A storage module and a shaping module are set in the access device provided by the embodiment of the present invention. The access device is located at the remote terminal, i.e. the access device is a remote access device.

Figure 5:
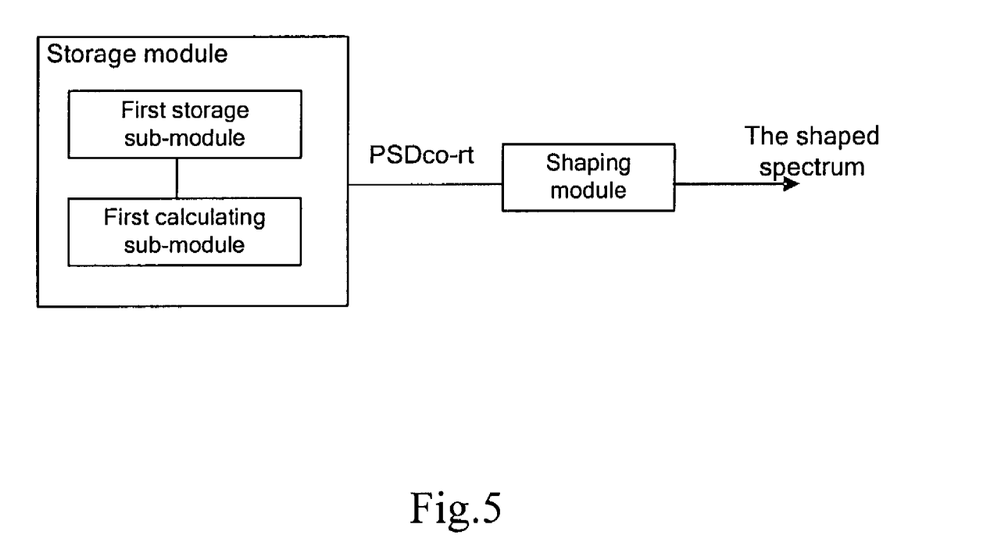
FIG. 5 is a first logical schematic diagram of the access device in accordance with another embodiment of the present invention.
Figure 6:
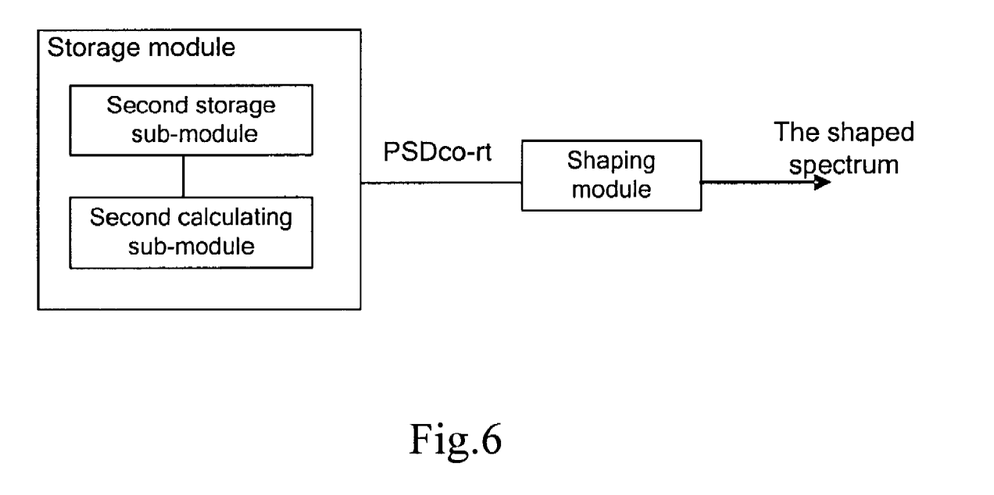
FIG. 6 is a second logical schematic diagram of the access device in accordance with another embodiment of the present invention.

The storage modules shown in FIG. 5 and FIG. 6 are mainly used to obtain and store the power spectrum density PSDco-rt of signal transmitted by the CO access device at the RT.

When getting the PSDco-rt at the remote access device after the power spectrum density of signal transmitted by the CO access device is attenuated according to the cable distance between the CO and the RT, and the line transfer function illustrating a relationship between line attenuation and frequency, the storage module is composed of a first storage sub-module and a first calculating sub-module, which are shown in FIG. 5.

The first storage sub-module shown in FIG. 5 is mainly used for storing the distance between the access device where the first storage sub-module locates and the CO access device, and the line transfer function illustrating a relationship between line attenuation and frequency.

The first calculating sub-module shown in FIG. 5 is mainly used for calculating the PSDco-rt at the RT after the power spectrum density of signal transmitted by the CO access device is attenuated according to the distance between the CO access device and the RT, and the line transfer function illustrating a relationship between line attenuation and frequency stored in the first storage sub-module. The specific procedures are described in the above method.

When calculating the power spectrum density PSDco-rt of signal transmitted by the CO at the RT according to the power spectrum density PSDxtalk of the crosstalk signal and the line crosstalk rejection ratio function, the storage module is composed of a second storage sub-module and a second calculating sub-module, which is shown in FIG. 6.

The second storage sub-module shown in FIG. 6 is mainly used for storing the power spectrum density of crosstalk signal at the remote access device, namely PSDcoxtalk. In the embodiments of the present invention, the remote access device is also named as RT.

The second calculating sub-module shown in FIG. 6 is mainly used for calculating the PSDco-rt according to the PSDcoxtalk and the line crosstalk coupling function stored in the second storage sub-module. The specific procedure is described in the above method.

The spectrum of remote access device includes two portions, i.e. the spectrum of remote access device is divided into a spectrum overlapping portion and a spectrum non-overlapping portion according to the PSDco-rt stored in the storage module.

The shaping modules shown in FIG. 5 and FIG. 6 are mainly used for determining the power spectrum density of signal transmitted by the remote access device in the spectrum overlapping portion according to the PSDco-rt to get the shaped spectrum for output; certainly, the power spectrum density of signal transmitted by the remote access device in the spectrum overlapping portion of the RT may also be approximately same to the PSDco-rt. The shaping module may obtain the Tss(i) coefficient of the spectrum overlapping portion of the of the RT firstly, and outputs the transmitting power spectrum density of the spectrum overlapping portion of the RT according to the Tss(i) coefficient. The shaping module may shape the spectrum of the spectrum non-overlapping portion of the RT by means of Tss(i)=1 or other preset values, which is specifically described in the above methods.

The remote access device of the embodiments of the present invention includes an ADSL2 or ADSL2+ or VDSL2 device.

As can be seen from the specific solution of the embodiments of the present invention, the power spectrum density of remote access device is divided into two portions in accordance with the embodiments of the present invention; the portion of crosstalk destination line overlapped by the transmitting power spectrum density of remote access device is determined according to the power spectrum density of crosstalk destination line; the unused (non-overlapping) portion of crosstalk destination line is determined according to other requirements (for example PSD mask and Limited PSD). Therefore, the total transmitting power spectrum density is obtained; then, the transceiver of remote access device calculates the Tss(i) coefficient according to the power spectrum density to get the actual shaped spectrum of the transmitting signal. In accordance with the present invention, it is possible to automatically or manually set the spectrum of downlink signal of CO access device at the remote access device, which maximizes the spectrum utilization ratio of remote access device. Therefore, the method and the access device provided by the embodiments of the present invention have better spectrum compatibility capability and flexibility, which makes it possible to get a better transmission performance in accordance with the embodiments of the present invention.

The foregoing is only preferred embodiments of this invention. The protection scope of this invention, however, is not limited to the above descriptions. Any change or substitution, within the technical scope disclosed by this invention, easily occurring to those skilled in the art, should be covered by the protection scope of this invention. Therefore, the protection scope of the present invention should be compatible with the protection scope stated by the following claims.

What is claimed is:

1. At a remote access device located between a central office and a customer premise equipment in a digital subscriber line system, a method for adjusting power spectrum density of an output signal for the remote access device in order to improve spectral compatibility, allow flexibility of spectrum settings, and improve transmission performance, the method comprising:
   obtaining a power spectrum density of a signal transmitted from a central office access device to a customer premise equipment, wherein the power spectrum density is determined at a remote access device located between the central office and the customer premise equipment;
   identifying a portion of the spectrum of the output signal of the remote access device that overlaps with a portion of a spectrum signal transmitted by the central office access device;
   based on the identified overlapping portion, adjusting the power spectrum density of the output signal of the portion of the spectrum overlapping with the portion of the spectrum of the signal transmitted by the central office access device according to the power spectrum density of the signal transmitted from the central office access device to the customer premise equipment;
   wherein obtaining the power spectrum density of the signal transmitted from the central office access device to the customer premise equipment comprises:
      obtaining a distance between the remote access device and the central office access device;
      obtaining a line transfer function illustrating a relationship between line attenuation and frequency;
         wherein the line transfer function is Attenu(i) (dB/km), the distance between the central office and the remote office is L, the signal is transmitted by means of nominal TX power of tone(i), the power spectrum density of signal transmitted by the central office access device at the remote access device is PSDco-rt(i), and wherein the PSDco-rt(i)=10 log TX power of tone(i)−L×Attenu(i);
      obtaining a nominal power spectrum density of the central office access device; and
      obtaining the power spectrum density of the signal transmitted from the central office access device to the customer premise equipment at a measured point between the central office and the customer premise equipment according to the distance, the line transfer function, and the nominal power spectrum density of the central office access device.

2. The method of claim 1, wherein the line transfer function is obtained by means of a line diagnosis mode of Asymmetric Digital Subscriber Line (ADSL)2, ADSL2+, or Very high bit rate DSL (VDSL2).

3. The method of claim 1, wherein adjusting the power spectrum density of the output signal of the portion of spectrum overlapping with the portion of the spectrum of the output signal transmitted by the central office access device comprises:
   replacing the power spectrum density of the output signal of the portion of spectrum overlapping with the portion of the spectrum with the power spectrum density of the signal transmitted by the central office access device.

4. The method of claim 1, wherein adjusting the power spectrum density of the output signal of the portion of the spectrum overlapping with the portion of the spectrum of the signal transmitted by the central office comprises:
   calculating power spectrum density shaping coefficients of the output signal in the spectrum overlapping portion and in the spectrum non-overlapping portion respectively according to the power spectrum density of the signal transmitted by the CO access device; and
   shaping the power spectrum density of the output signal according to the power spectrum density shaping coefficients.

5. The method of claim 4, further comprising: setting the power spectrum density shaping coefficient of the output signal in the spectrum non-overlapping portion as 1 or a preset value.

6. In a digital subscriber line system, in order to improve spectrum compatibility between a central office device and a remote access device located between the central office access device and a customer premise equipment, the remote access device comprising:
   a storage module, configured to obtain and store a power spectrum density of a signal transmitted from a central office access device to a customer premise equipment, wherein the power spectrum density is determined at the storage module of the remote access device; and
   a shaping module, configured to adjust the power spectrum density of a portion of a spectrum of an output signal, which overlaps with a portion of a spectrum of a signal transmitted by the central office access device adoring to the power spectrum density of the signal transmitted by the central office access device to the customer premise equipment;
   wherein the storage module obtaining the power spectrum density of the signal transmitted from the central office access device to the customer premise equipment comprises:
      a first storage sub-module, configured to obtain and store a distance between the remote access device and the central office access device, a line transfer function illustrating a relationship between line attenuation and frequency, and a nominal power spectrum density of the central office access device;
         wherein the line transfer function is Attenu(i) (dB/km), the distance between the central office and the remote office is L, the signal is transmitted by means of nominal TX power of tone(i), the power spectrum density of signal transmitted by the central office access device at the remote access device is PSDco-rt(i), and wherein the PSDco-rt(i)=10 log TX power of tone(i)−L×Attenu(i); and
      a first calculating sub-module, configured to calculate the power spectrum density of the signal transmitted from the central office access device to the customer premise equipment at a measured point between the central office and the customer premise equipment according to the distance, the line transfer function, and the nominal power spectrum density of the central office access device.

7. At a remote access device located between a central office and a customer premise equipment in a digital subscriber line system, in order to adjust power spectrum density of an output signal for the remote access device to improve spectral compatibility, allow flexibility of spectrum settings, and improve transmission performance, a computer program product stored on a non-transitory computer readable medium comprising computer executable instructions that when executed implement the following:
   obtain a power spectrum density of a signal transmitted from a central office access device to a customer premise equipment, wherein the power spectrum density is determined at a remote access device located between the central office and the customer premise equipment;

identify a portion of the spectrum of the output signal of the remote access device that overlaps with a portion of a spectrum signal transmitted by the central office access device; and based on the identified overlapping portion, adjust the power spectrum density of the output signal of the portion of the spectrum overlapping with the portion of the spectrum of the signal transmitted by the central office access device according to the power spectrum density of the signal transmitted from the central office access device to the customer premise equipment;

wherein obtaining the power spectrum density of the signal transmitted from the central office access device to the customer premise equipment comprises:

obtaining a distance between the remote access device and the central office access device;

obtaining a line transfer function illustrating a relationship between line attenuation and frequency;

wherein the line transfer function is Attenu(i) (dB/km), the distance between the central office and the remote office is L, the signal is transmitted by means of nominal TX power of tone(i), the power spectrum density of signal transmitted by the central office access device at the remote access device is PSDco-rt(i), and wherein the PSDco-rt(i)=10 log TX power of tone(i)−L×Attenu(i);

obtaining a nominal power spectrum density of the central office access device; and     obtaining the power spectrum density of the signal transmitted from the central office access device to the customer premise equipment at a measured point between the central office and the customer premise equipment according to the distance, the line transfer function, and the nominal power spectrum density of the central office access device.

* * * * *